United States Patent
Kawamura et al.

[11] Patent Number: 6,140,757
[45] Date of Patent: Oct. 31, 2000

[54] COLOR CATHODE-RAY TUBE (CRT) AND METHOD OF PRODUCING THE SAME

[75] Inventors: Hiromitsu Kawamura; Katsumi Kobara, both of Mobara; Takao Kawamura, Chiba, all of Japan

[73] Assignee: Hitachi, Ltd., Tokyo, Japan

[21] Appl. No.: 08/232,459

[22] Filed: Apr. 22, 1994

Related U.S. Application Data

[63] Continuation of application No. 07/850,968, Mar. 11, 1992, abandoned.

[30] Foreign Application Priority Data

Mar. 11, 1991 [JP] Japan ................................. 3-044664

[51] Int. Cl.⁷ .................................................... H01J 29/28
[52] U.S. Cl. ............................................................ 313/466
[58] Field of Search .................................. 313/466, 473, 313/474; 427/68

[56] References Cited

U.S. PATENT DOCUMENTS

| | | |
|---|---|---|
| 4,392,077 | 7/1983 | Libman . |
| 4,717,856 | 1/1988 | Kato ........................................ 313/473 |
| 5,177,400 | 1/1993 | Iwasaki ................................ 313/473 X |

FOREIGN PATENT DOCUMENTS

| | | | |
|---|---|---|---|
| 0187860 | 6/1985 | European Pat. Off. | H01J 29/28 |
| 61-010828 | 1/1986 | Japan | H01J 9/227 |

*Primary Examiner*—Sandra O'Shea
*Attorney, Agent, or Firm*—Antonelli, Terry, Stout & Kraus, LLP

[57] ABSTRACT

A color cathode-ray tube includes an antireflection layer and a black matrix layer on the inner surface of a face plate thereof. The antireflection layer contains $SiO_2$ fine particles and is deposited on the inner surface of the face plate without being interposed between the face plate and the black matrix layer.

14 Claims, 3 Drawing Sheets

COLOR CATHODE-RAY TUBE (CRT) AND METHOD OF PRODUCING THE SAME

This application is a continuation of application Ser. No. 07/850,968, filed on Mar. 11, 1992, now abandoned.

BACKGROUND OF THE INVENTION

1. Field of the Invention

This invention relates to a color cathode-ray tube (CRT) including an antireflection layer on its face plate and a method of producing the color cathode-ray tube. More particularly, it relates to a color cathode-ray tube having an antireflection layer suitable for preventing reflection of external light on the inner surface of a face plate and a method of producing the color cathode-ray tube.

2. Description of the Prior Art

Since the surface of a face plate (an image display surface) of cathode-ray tubes generally has luster, the cathode-ray tubes involve the problem that external light is strongly reflected and an image displayed on the face plate surface cannot be seen easily. Particularly because display devices consisting of various cathode-ray tubes have gained a wide application as a terminal device of information systems in addition television receivers, the problem of external light reflection described above has been wide spread in the field of VDT (visual display terminals), and requirements for preventing reflection have become stronger and stronger.

Various counter-measures have so far been taken in order to prevent reflection of external light. One of them etches a glass surface by hydrogen silicofluoride so as to form corrugations having a depth of 5 to 3,000 nm and a pitch of 10 to 200 nm and thus to impart a reflection prevention function (U.S. Pat. No. 2,490,662), and another method blows an alcohol solution of alkoxysilane ($Si(OR)_4$) (where R is an alkyl group) to the glass surface and then bakes the surface so as to form corrugations consisting of a $SiO_2$ film (Japanese Patent Laid-Open No. 118932/1986).

To prevent reflection in a high precision display tube for which high resolution is requisite and in a cathode ray tube for high definition television, a method has already been put into practical application which deposits a single layer of a metal compound such as $MgF_2$, $TiO_2$ or $SiO_2$ or a polymer compound or laminates a plurality of the layers, accurately controls the film thickness and refractive index and weakens reflected light by utilizing interference of light.

However, all of the methods described above are the methods of preventing reflection which are directed to the outer surface of the face plate of the cathode-ray tube. According to the methods alone, there occurs the case where the influence of external light reflected on the inner surface of the face plate strongly appears on the surface and makes an image rather invisible.

Here, it may be conceivable to form the antireflection layer having the content described above on the inner surface of the face plate. However, phosphor must be coated on the inner surface of the cathode-ray tube, and the antireflection layer must sufficiently withstand the influence of this coating. Therefore, there are various problems. In other words, according to the method of coarsening the inner surface of the face plate by $H_2SiF_6$ etching, there are the problems that the resulting coarse surface changes due to various chemical treatments when the phosphor is coated, and the phosphor cannot be coated flatly. In the case of the method which forms the corrugated surface by blowing the $Si(OR)_4$ alcohol solution, there is the problem that the corrugation on the surface is so vigorous that the phosphor cannot well be deposited. Furthermore, in the case of the lamination of the metal compound or the polymer compound, the film layer is generally formed by vacuum deposition or sputtering. However, there is the problem that film quality is extremely apt to modify and the reflective index drastically increases due to heat-treatment and chemical treatment when the phosphor is coated.

To solve such problems, the inventors of the present invention previously proposed a cathode-ray tube having a film which exhibits antireflection characteristics on the inner surface of the face plate and production method of such a cathode-ray tube in Japanese Patent Application No. 45374/1990.

[Problem to be Solved by the Invention]

The technique proposed previously by the present inventors is the technique which comprises coating an alcohol solution of $Si(OR)_4$ containing $SiO_2$ added thereto on the inner surface 3' of the face plate 3 of the cathode-ray tube as shown in FIG. 5, baking the face plate to form the antireflection layer 5 consisting of a $SiO_2$ film, and forming thereon a black matrix graphite layer 4 (hereinafter referred to as a "BM layer") and a phosphor layer 6.

However, the technique described above involves the following problems.

(1) In this case, the antireflection layer 5 exists between the inner surface 3' of the face plate 3 and the BM layer 4 as shown in FIG. 5. Therefore, the beam holes 4' of the BM layer cannot be opened accurately in a clear-cut form. Although demands for high precision color cathode-ray tubes having a small beam diameter and a fine pitch have become strong particularly in recent years, this technique cannot cope with these demands.

(2) The antireflection layer 5 exists between the inner surface 3' of the face plate 3 and the BM layer 4 as shown in FIG. 5. Therefore, the BM layer 4 appears somewhat white due to diffused and reflected light from this antireflection layer 5. Since the original function of the BM layer is to improve contrast, it must appear as black as possible.

(3) Furthermore, when the BM layer 4 is coated, the inner surface 3' of the face plate as the coated surface must be cleansed chemically by hydrofluoric acid or an alkali. If the antireflection film 5 is disposed beforehand, however, denaturation of the antireflection film 5 by the acid or the alkali might occur, and there is the limitation that sufficient washing cannot be made.

SUMMARY OF THE INVENTION

It is an object of the present invention to provide a color cathode-ray tube and method of producing the same which solves the problems with the prior art and previous proposal described above, can open the beam holes of the BM layer in a clean-cut form, can provide an image having excellent contrast and has an antireflection layer which can withstand various treatments at the time of coating of the phosphor, does not exert adverse influences on the coating of the phosphor, and moreover has sufficient and satisfactory antireflection characteristics on the inner surface of the face plate.

In the production of a color cathode-ray tube having an antireflection layer on the inner surface of a face plate, the object described above can be accomplished by a color cathode-ray tube produced by coating an alcohol solution of $Si(OR)_4$ containing $SiO_2$ fine particles added thereto on the inner surface of the face plate after the BM layer is formed, and forming an antireflection layer containing the $SiO_2$ fine particles on the surface of the face plate on which at least the BM layer does not exist.

Speaking more definitely, in the formation step of the BM and phosphor layers of an ordinary cathode-ray tube, the inner surface of the face plate is first washed and cleansed by hydrofluoric acid, etc, and then the BM layer is formed by an ordinary method. Next, the alcohol solution of $Si(OR)_4$ containing the $SiO_2$ fine particles is coated, and is then dried at a temperature of about 100° C. to form the antireflection layer consisting of the $SiO_2$ fine particles and a $SiO_2$ binder fixing the particles. Finally, the phosphor layer is coated by an ordinary method.

According to the color cathode-ray tube and its production method of the present invention, the antireflection layer is formed after the BM layer is formed. Therefore, the BM layer can be formed highly accurately, and the quality of the beam holes such as their shape, cuttability and uniformity, can be improved. Furthermore, since the diffusion layer for preventing reflection does not exist between the inner surface of the face plate and the BM layer, the black color inherent to BM can be maintained.

The occupying area of the BM layer with respect to the entire inner surface of the face plate is about 20%, and the antireflection effect corresponding to this percentage is lost. However, since the antireflection layer is coated on the remaining 80% surface area, substantial influences due to loss hardly exist.

The antireflection layer is composed of the $SiO_2$ fine particles and its thickness is below 0.5 $\mu$m. The grain size of the phosphor coated on the antireflection layer is about 10 $\mu$m. Therefore, the antireflection layer does not at all affect coating accuracy of the phosphor. Furthermore, the antireflection layer is composed of $SiO_2$ and its transmission factor is 90% and is equal to, or higher than, that of glass. Therefore, the antireflection layer does not affect luminance of the phosphor, and luminance can rather be improved because the proportion of emitted light of the phosphor appearing on the front surface becomes greater due to the reflection prevention effect.

When the BM layer is coated, the finish accuracy of BM is greatly affected by cleanness of the base. In the method of the proposal of the prior art described above, the base consists of the antireflection film and hence, a strong washing agent such as hydrofluoric acid, caustic soda, etc, cannot be used. In the case of the method of the present invention, the use of such washing agents is possible. Accordingly, an extremely clean BM film can be obtained.

Furthermore, since the antireflection layer formed on the inner surface of the face plate in the manner described above is composed of the fine particles of $SiO_2$, the surface is extremely flat, and coating of the phosphor and black matrix graphite to the surface of this layer can be made easily. Since the fine particles of $SiO_2$ are firmly fixed by the $SiO_2$ binder formed by the decomposition of $Si(OR)_4$, it has excellent chemical, mechanical and thermal strength, and exhibits excellent durability to various chemical treatments and heat-treatment.

DESCRIPTION OF THE PREFERRED EMBODIMENT

Hereinafter, the cathode-ray tube and its production method according to the present invention will be explained definitely with reference to its embodiment.

Figure 2:
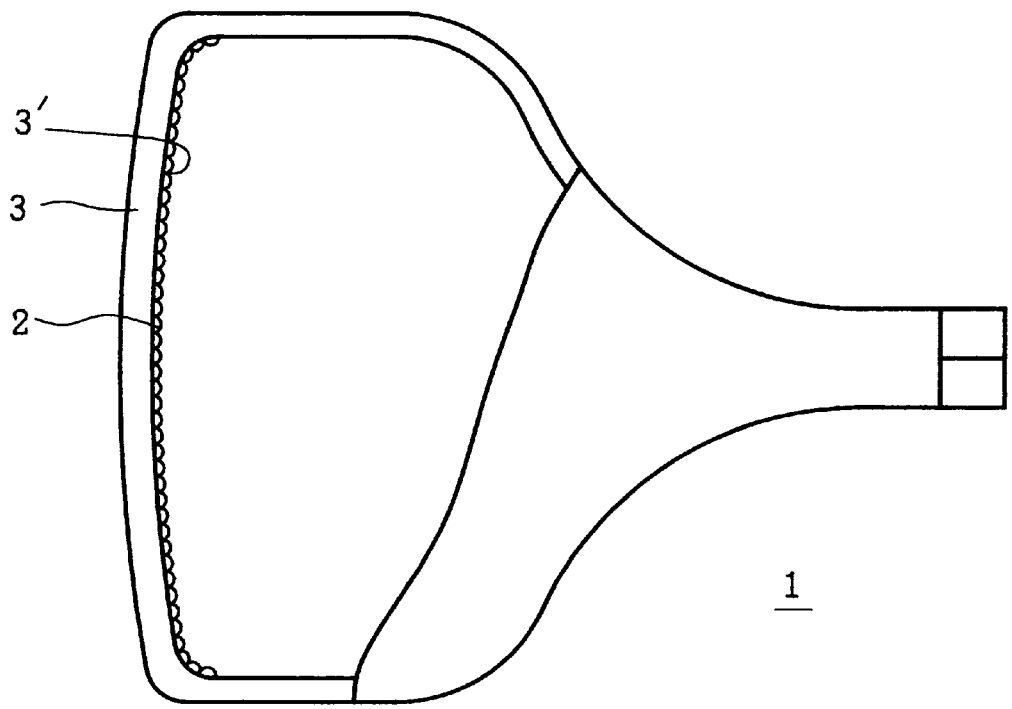
FIG. 2 is a partial sectional view showing the schematic construction of a color cathode-ray tube according to the present invention.
Figure 3:
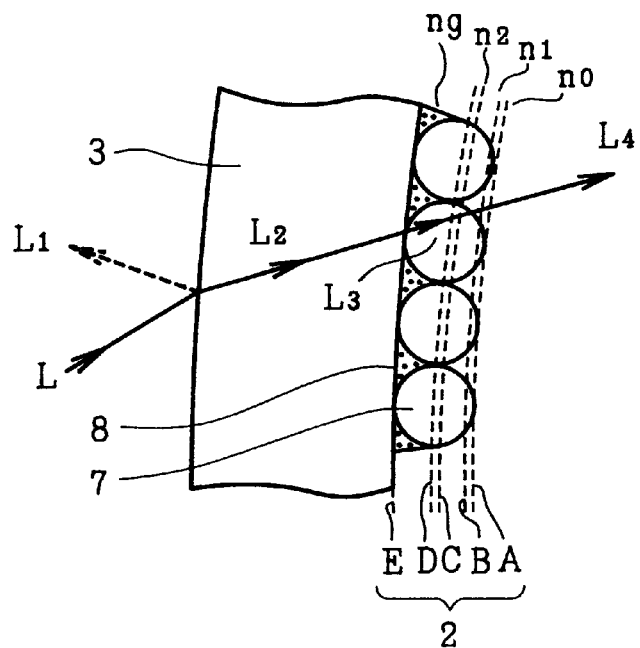
FIG. 3 is a view useful for explaining a. reflection prevention mechanism by the antireflection layer shown in FIG. 2.
Figure 5:
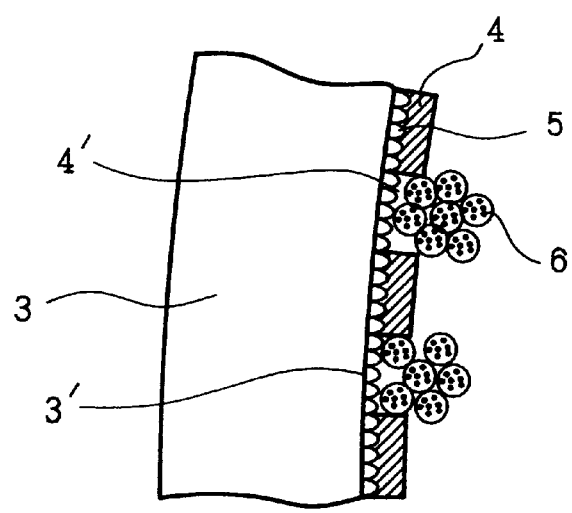

FIG. 2 is a partial sectional view showing the schematic structure of the color cathode-ray tube according to the present invention, and FIG. 3 is an explanatory view for explaining a reflection prevention mechanism in the antireflection layer shown in FIG. 2.

When external light L, as shown in FIG. 3, is incident to the outer surface of a face plate 3, part of this light is reflected by the outer surface and changes to reflected light $L_1$ and part becomes incident light $L_2$ into the inner surface of the face plate 3. If the antireflection layer 2 does not exist, $L_2$ is reflected by the E surface and again comes out to the outer surface. However, since the portion between E and D of the inner surface of the face plate 3 is filled with the $SiO_2$ fine particles 7 and the binder 8 which fixes the particles 7 and since its refractive index is substantially equal to the refractive index of glass $SiO_2$, i.e. about 1.47, this light transmits through the E surface due to the interference and becomes incident light $L_3$. If the D surface is a flat inner surface, $L_3$ is reflected by the D surface. However, fine hemi-spherical corrugations continuously exist more inward than the D surface and the refractive index of the layer existing more inward than the D surface decreases continuously and gradually, light $L_3$ receives re-interference by this layer, passes through this layer and travels further inward as incident light $L_4$.

When a plate which is cut on a plane parallel to the plane between both end surfaces A and D of the fine corrugation portion described above and which has a very small thickness is assumed, the refractive index of the fine corrugation portion changes continuously in accordance with the volume fraction of $SiO_2$, that is, the proportion of the volume of the $SiO_2$ portion to the total volume of the plate.

Assuming that the refractive index between E and D of the antireflection layer 2 is $n_g$, the refractive index on the C surface which is somewhat more inward than the D surface is $n_2$, the refractive index of the B surface which is somewhat outward than the A surface is $n_1$ and the refractive index in the internal space inside the A surface is $n_0$, the condition which minimizes the reflection factor in the antireflection layer is given as follows:

$$R = \frac{(n_1 n_g - n_2 n_o)^2}{(n_1 n_g + n_2 n_0)2} = 0 \tag{1}$$

From equation (1), non-reflection performance can be obtained when the following condition is satisfied:

$$ng = \frac{n_2}{n_1} \tag{2}$$

Here, the value $n_2/n_1$ is determined by the shape of the corrugation. When the alcohol solution of $Si(OR)_4$ containing the SiO₂ fine particles added thereto is coated and baked, the corrugations satisfying approximately the equation given above can be formed.

Figure 1:
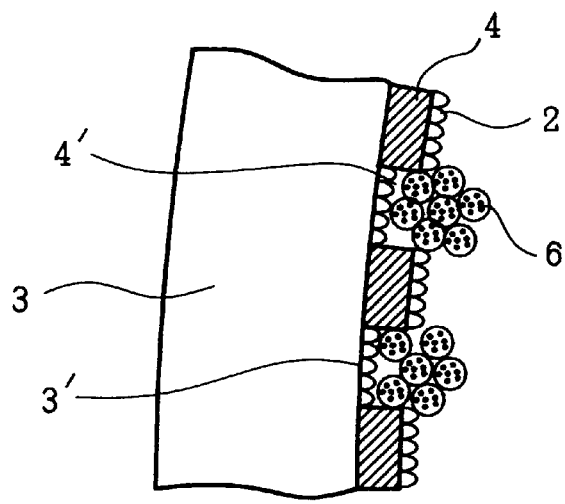
FIG. 1 is an enlarged view of the principal portions of a face plate of a color cathode-ray tube having the construction of this invention.

Next, the method of producing the color cathode-ray tube according to the present invention will be explained with reference to FIGS. 1 and 2.

First of all, ethyl silicate (Si(OC$_2$H$_5$)$_4$) is dissolved in ethanol, and H$_2$O for hydrolysis and HNO$_3$ as a catalyst are added to prepare a solution. After SiO$_2$ particles classified into a predetermined grain size (e.g. 0.2±0.01 μm) are added to this solution, pH of the solution is adjusted so as to obtain sufficient dispersion. On the other hand, the inner surface 3' of the face plate 3 of the color cathode-ray tube 1 is washed with 5% hydrofluoric acid, caustic soda and hot pure water at 70 to 80° C. in predetermined procedures, and the BM layer 4 is then formed by a predetermined method. The solution for forming the antireflection layer described above is thereafter added dropwise onto the inner surface 3' and is uniformly coated by spinning. It is also possible to employ a method which disposes a pre-coat film before spin-coating in order to improve wettability of the coated surface 3' and to prevent denaturation of the BM layer 4, or a method which coats and exposes a mixed solution of the Si(OR)$_4$ solution containing the SiO$_2$ fine particles added thereto and a photosensitive resin, so as to form the antireflection layer 2 on only the necessary portion. Next, the coated layers 2 and 4 are dried and fixed at about 100° C. using an infrared lamp and after hydrolysis has proceeded to a certain extent and has reached a stable state, the phosphor layer 6 is formed on the layers 2 and 4 by a predetermined method.

The process described above can form extremely uniformly the BM layer 4 and the phosphor layer 6.

By the way, drying, fixation and decomposition can be executed in match with the production process of the color cathode-ray tube 1. The temperature is raised to around 400° C. in the frit baking and exhaust steps as the post-process of the production of the color cathode-ray tube 1. Therefore, the coated layers 1, 4 and 6 become sufficiently firm and strong and adhesion, too, can be accomplished sufficiently.

Figure 4:
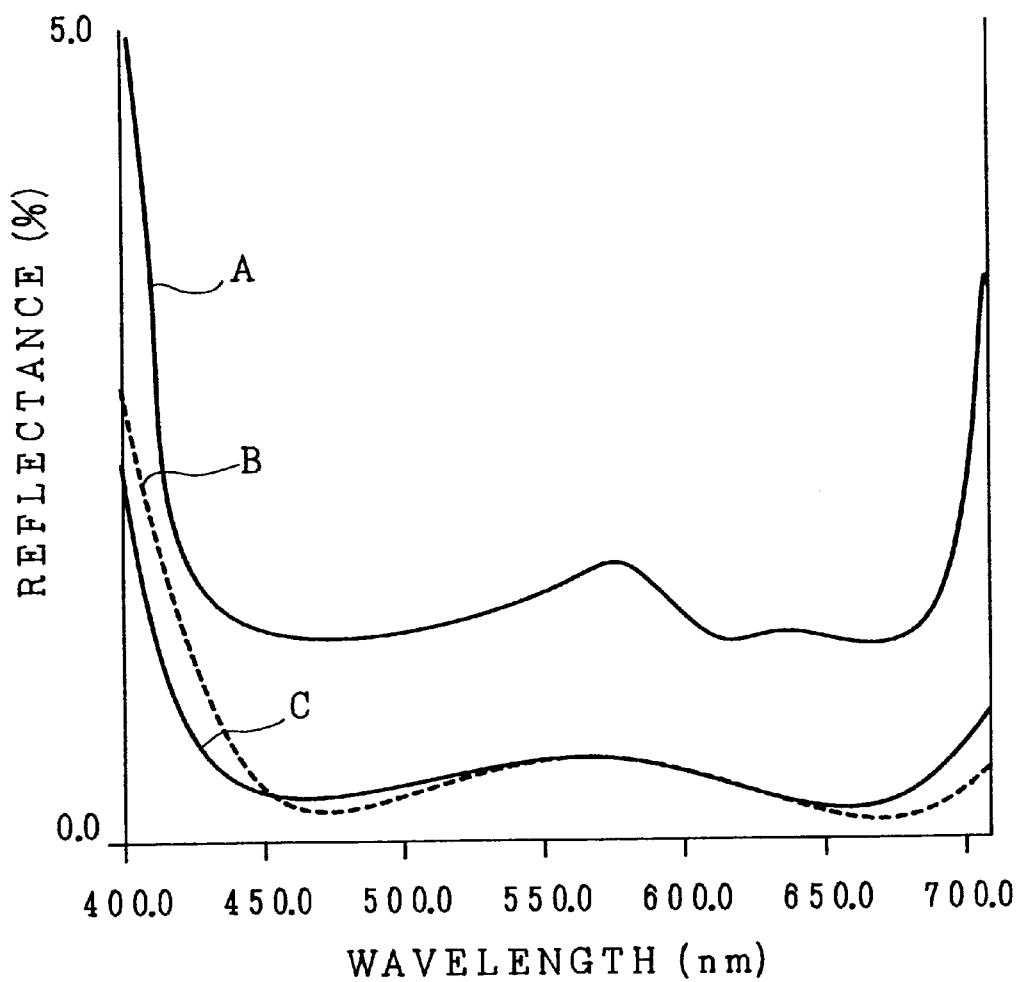
FIG. 4 is a view showing comparatively regular reflection factor curves on the inner surface of the face plate of color cathode-ray tubes; and, FIG. 5 is an enlarged view of the principal portions of the face plate of a color cathode-ray tube having the construction of the previous proposal.

When the reflection factor of the inner surface of the face plate of the color cathode-ray tube obtained in the manner described above is measured by a "Hitachi U-3200" spectrophotometer, the result shown in FIG. 4 can be obtained. The cathode-ray tube used for this measurement is constituted so that only the reflection factor of the inner surface of the face plate can be measured, by depositing the antireflection film to the outer surface of the face plate. In FIG. 4, symbol A represents a regular reflection factor of a color cathode-ray tube not having the antireflection layer on the inner surface; B is a regular reflection factor curve of a color cathode-ray tube having the antireflection layer containing SiO$_2$ fine particles having a grain size of 0.3 μm on the inner surface; and C is a regular reflection factor curve of a color cathode-ray tube having an antireflection layer containing SiO$_2$ fine particles having a grain size of 0.5 μm on the inner surface. It can be understood from this result that the values 1.74% for A, 0.44% for B and 0.41% for C can be obtained in terms of the integration values within the range of a wavelength of 400 to 700 nm, and that B and C exhibit a by far drastic reflection reduction effect than A. The reflection factor of about 0.4% is a value which is hardly noticeable to eyes.

In contrast with A, in the cases of B and C, the color of BM is black and remains clear, and when the color cathode-ray tube are lit, the improvement of contrast by 20% can be observed by the reflection prevention effect. Further, accuracy of the beam holes of the BM layer is excellent and focus characteristics, too, are excellent.

As described above, when the color cathode-ray tube having the construction of the present invention is obtained by the production method of the color cathode-ray tube according to the present invention, it becomes possible to solve the problems with the prior art and previous proposal, to bore the beam holes of the BM layer in the clear-cut form and to provide an image having excellent contrast. Furthermore, the cathode-ray tube of this invention can withstand various treatments at the time of coating of the phosphor, does not exert any adverse influence on the coating of the phosphor, and can obtain sufficiently satisfactory reflection prevention characteristics of external light on the inner surface of the face plate.

The formation of the antireflection layer can be carried out easily by applying the production method of the color cathode-ray tube according to the present invention by merely modifying somewhat the conventional production processes of the color cathode-ray tube, and the color cathode-ray tube having reflection prevention characteristics can be obtained at a low production cost.

What is claimed is:

1. A color cathode-ray tube (CRT) including an antireflection layer and a black matrix layer on the inner surface of a face plate thereof, wherein said antireflection layer contains SiO$_2$ fine particles and is deposited on the surface of said face plate without being interposed between said face plate and said black matrix layer.

2. A method of producing a color cathode-ray tube including an antireflection layer and a black matrix layer on the inner surface of a face plate, comprising the steps of forming a black matrix layer on the inner surface of a face plate, coating said black matrix layer and an exposed surface of said face plate with an alcohol solution of an Si(OR)$_4$ (where R is an alkyl group) containing SiO$_2$ fine particles, and forming an antireflection layer containing SiO$_2$ fine particles on said exposed surface of said face plate.

3. A color cathode-ray tube (CRT) according to claim 1, wherein said antireflection layer has a thickness less than 0.5 μm.

4. A color cathode-ray tube (CRT) according to claim 1, wherein said SiO$_2$ fine particles of said anti-reflection layer have a grain size no less than about 0.2 μm and no greater than 0.5 μm.

5. A color cathode-ray tube (CRT) according to claim 4, wherein said fine particles have a grain size of 0.3 μm.

6. A color cathode-ray tube (CRT) according to claim 1, wherein said black matrix layer is formed on the inner surface of said face plate in a predetermined pattern so as to provide an exposed surface on the inner surface of said face plate, said antireflection layer being deposited on the exposed surface of said face plate.

7. A method according to claim 2, wherein said antireflection layer has a thickness less than 0.5 μm.

8. A method according to claim 2, wherein said SiO$_2$ fine particles of said antireflection layer have a grain size no less than about 0.2 μm and no greater than 0.5 μm.

9. A method according to claim 2, wherein said black matrix layer is formed on the inner surface of said face plate in a predetermined pattern so as to provide said exposed surface on the inner surface of said face plate.

10. A color cathode-ray tube (CRT) according to claim 1, wherein said antireflection layer containing SiO$_2$ fine particles is formed from an alcohol solution of an Si(OR)$_4$ (where R is an alkyl group) containing the SiO$_2$ fine particles.

11. A color cathode-ray tube (CRT) according to claim 1, wherein said antireflection layer has a transmission factor of 90% which is at least equal to a transmission factor of a glass of said face plate.

12. A method according to claim 2, wherein said antireflection layer has a transmission factor of 90% which is at least equal to a transmission factor of a glass of said face plate.

13. A method according to claim 2, wherein said fine particles have a grain size of 0.3 $\mu$m.

14. A color cathode-ray tube (CRT) including a layer for performing antireflection and a black matrix layer on the inner surface of a face plate thereof, wherein said layer for performing antireflection contains $SiO_2$ fine particles and is deposited on the said face plate without being interposed between said face plate and said black matrix layer.

\* \* \* \* \*